「12」 United States Patent
Smith et al.

(10) Patent No.: US 9,637,271 B2
(45) Date of Patent: May 2, 2017

(54) CONTAINER WITH A MEDAL

(71) Applicant: Owens-Brockway Glass Container Inc., Perrysburg, OH (US)

(72) Inventors: Roger P. Smith, Perrysburg, OH (US); Jessica R. Bryant, Toledo, OH (US); Douglas Laib, Perrysburg, OH (US); Susan L. Smith, Rossford, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 398 days.

(21) Appl. No.: 13/832,605

(22) Filed: Mar. 15, 2013

(65) Prior Publication Data

US 2014/0262897 A1    Sep. 18, 2014

(51) Int. Cl.
  *B65D 23/14*    (2006.01)
  *B23P 11/00*    (2006.01)
  *B65D 79/02*    (2006.01)
  *B65D 51/24*    (2006.01)
  *B65D 55/02*    (2006.01)
  (Continued)

(52) U.S. Cl.
  CPC .............. *B65D 23/14* (2013.01); *B23P 11/00* (2013.01); *B65D 51/248* (2013.01); *B65D 55/024* (2013.01); *B65D 55/026* (2013.01); *B65D 55/06* (2013.01); *B65D 79/02* (2013.01); *G06K 7/0008* (2013.01); *B65D 2101/00* (2013.01); *B65D 2101/0023* (2013.01); *B65D 2101/0084* (2013.01); *Y10T 29/49876* (2015.01); *Y10T 29/49913* (2015.01); *Y10T 29/49925* (2015.01)

(58) Field of Classification Search
  CPC ........ B65D 79/02; B65D 23/14; B65D 55/16; B65D 51/248; B65D 55/024; B65D 55/026; B65D 55/06; B65D 1/0246; B65D 1/023; B23P 11/00; A47G 19/2227; G06K 7/0008
  USPC ....... 40/311, 310; 206/459.1, 459.5; 29/453, 29/508, 515; 220/375; 215/365, 306; 340/572.1, 669; 65/153
  See application file for complete search history.

(56) References Cited

U.S. PATENT DOCUMENTS 1,042,669 A    10/1912    Gruver
1,554,191 A    9/1925    Alexander
(Continued)

FOREIGN PATENT DOCUMENTS

EP    0757012 A1    2/1997
FR    2306840 A1    11/1976
(Continued)

OTHER PUBLICATIONS

Sweet, Stuart. "What is a Good Material for an Antenna?", Signal Group, http://forums.solidsignal.com/showthread.php/2306-What-is-a-good-material-for-an-antenna, Oct. 1, 2012, Parts 1 and 2.*
(Continued)

*Primary Examiner* — Robert J Hicks
(74) *Attorney, Agent, or Firm* — Reising Ethington PC

(57) ABSTRACT

A container may include a wall and a medal retained to the wall by container material of integral one-piece construction with the wall and extending over at least a portion of the medal. The medal and one or more portions of the container adjacent the medal have a shared unique appearance. A package may include a flaccid loop coupled between a closure and a container to which the closure is coupled, and a medal coupled to the flaccid loop.

20 Claims, 6 Drawing Sheets

(51) Int. Cl.
*B65D 55/06* (2006.01)
*G06K 7/00* (2006.01)

(56) References Cited

U.S. PATENT DOCUMENTS

| | | | |
|---|---|---|---|
| 2,040,381 | A | 5/1936 | Hull |
| 2,091,460 | A | 8/1937 | Valliant et al. |
| 3,374,807 | A | 3/1968 | Michael |
| 3,399,811 | A | 9/1968 | Miller |
| 3,502,022 | A | 3/1970 | Wood |
| 3,603,472 | A | 9/1971 | Lecinski, Jr. et al. |
| 3,899,295 | A | 8/1975 | Halpern |
| 4,182,461 | A | 1/1980 | Waldau |
| 4,411,369 | A | 10/1983 | Borows |
| 4,449,637 | A | 5/1984 | Snecker |
| 4,489,841 | A | 12/1984 | Thompson |
| 4,502,605 | A | 3/1985 | Wloszczyna |
| 4,505,399 | A | 3/1985 | Weiner |
| 4,511,052 | A | 4/1985 | Klein et al. |
| 4,669,641 | A * | 6/1987 | Holmes ............ B65D 55/16 215/306 |
| 5,443,987 | A | 8/1995 | DeCicco et al. |
| 5,617,812 | A | 4/1997 | Balderson et al. |
| 5,806,697 | A | 9/1998 | Harbutt et al. |
| 5,971,179 | A | 10/1999 | Christmas et al. |
| 6,226,619 | B1 | 5/2001 | Halperin et al. |
| 6,378,906 | B1 | 4/2002 | Pennaz |
| 2003/0043039 | A1 | 3/2003 | Salemi et al. |
| 2004/0004829 | A1 | 1/2004 | Policappelli |
| 2004/0206765 | A1 | 10/2004 | McMahon, III et al. |
| 2006/0138138 | A1 | 6/2006 | Mishra |
| 2006/0139928 | A1 | 6/2006 | Griffiths et al. |
| 2008/0110774 | A1 | 5/2008 | Chisholm et al. |
| 2009/0212954 | A1 | 8/2009 | Adstedt et al. |
| 2010/0012542 | A1 | 1/2010 | Methuen |
| 2010/0078010 | A1 * | 4/2010 | Kolb ............ F24J 1/00 126/263.08 |
| 2010/0156614 | A1 | 6/2010 | Adstedt et al. |
| 2010/0245036 | A1 | 9/2010 | Adstedt et al. |
| 2010/0326952 | A1 | 12/2010 | Corliss |
| 2011/0169642 | A1 | 7/2011 | Adstedt et al. |
| 2011/0215160 | A1 | 9/2011 | Adstedt et al. |
| 2012/0291894 | A1 | 11/2012 | Higgins |
| 2014/0116009 | A1 * | 5/2014 | Herman ............ B65D 23/02 53/467 |
| 2014/0138274 | A1 * | 5/2014 | Smith ............ B65D 49/00 206/459.1 |

FOREIGN PATENT DOCUMENTS

FR 2653923 5/1991
RU EP 1151931 A1 * 11/2001 ............ B65D 41/58

OTHER PUBLICATIONS

PCT Search Report and Written Opinion, Int Serial No. PCT/US2014/020992, Int Filing Date: Mar. 6, 2014, Applicant: Owens-Brockway Glass Container Inc., Mail Date: Jul. 16, 2014.

* cited by examiner

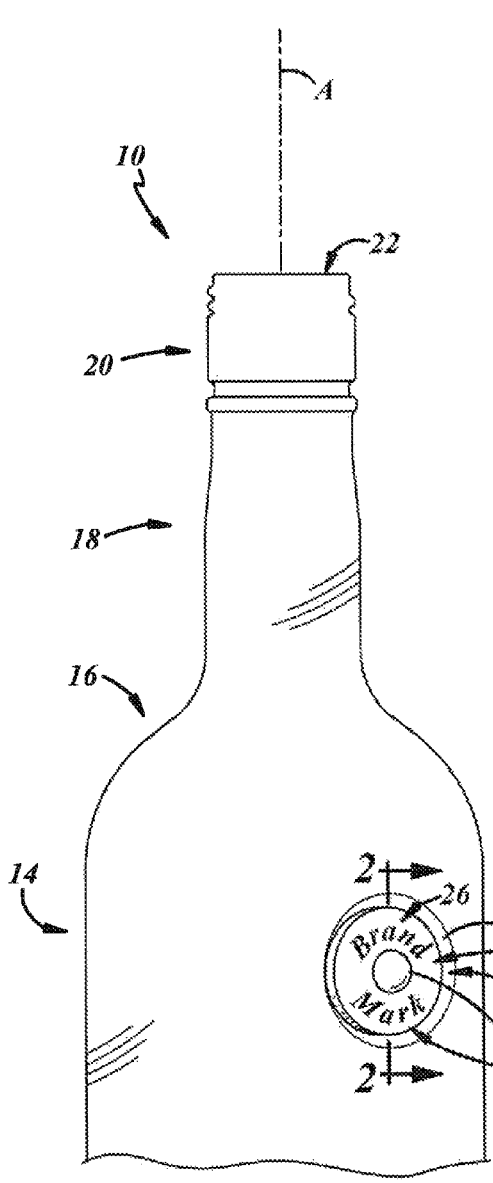
FIG. 1
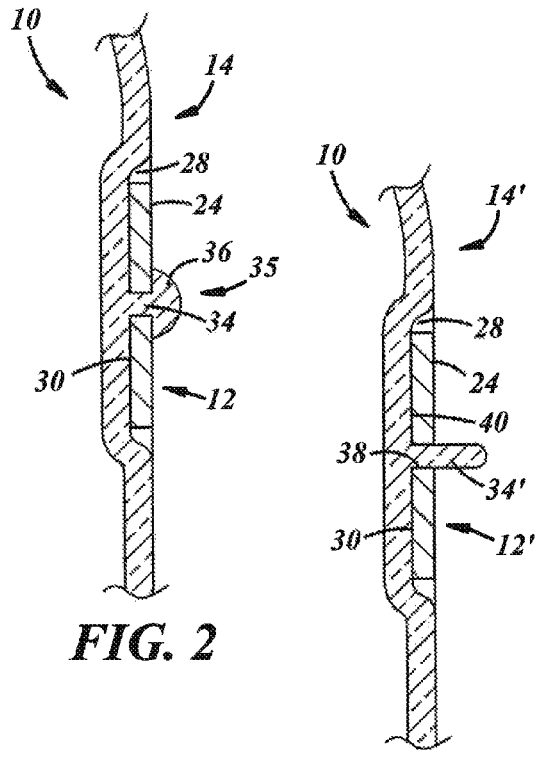
FIG. 2
FIG. 3
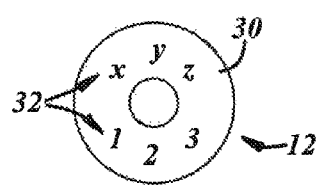
FIG. 1A

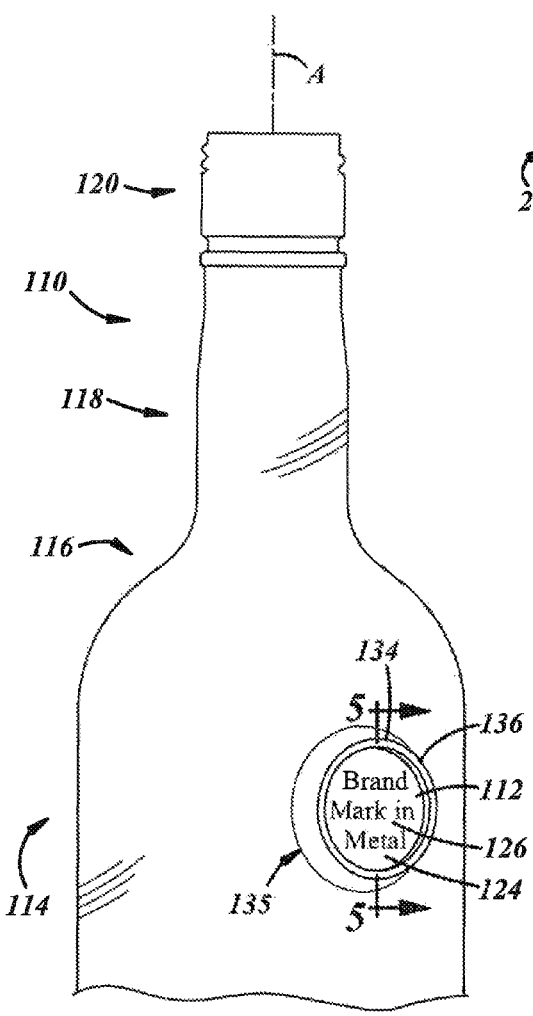
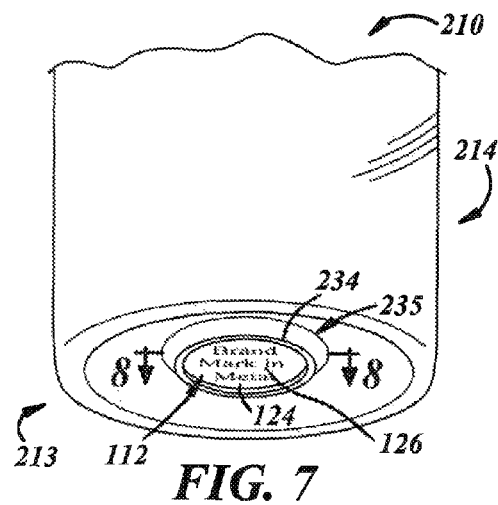
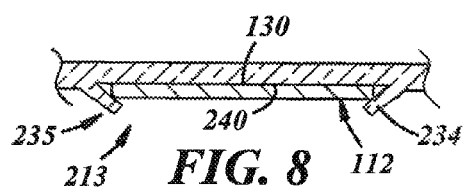
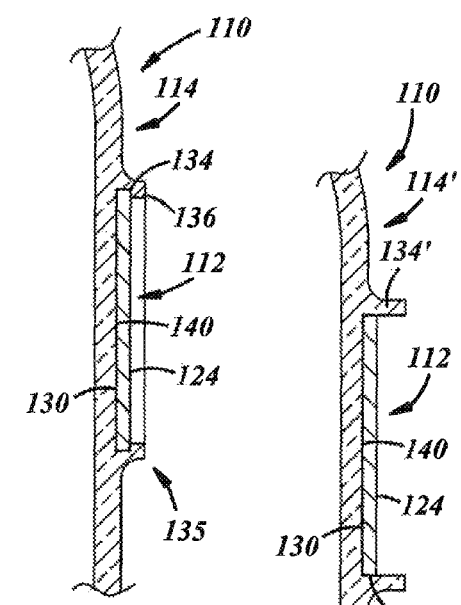
FIG. 8
FIG. 7
FIG. 4
FIG. 5
FIG. 6

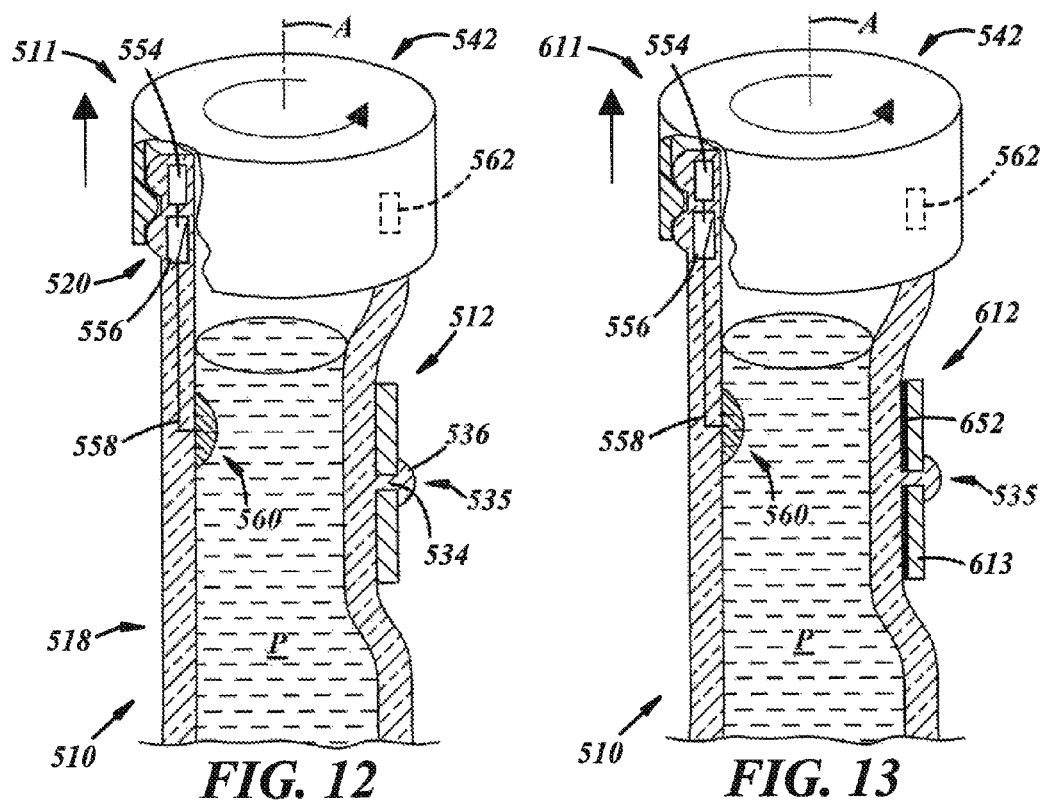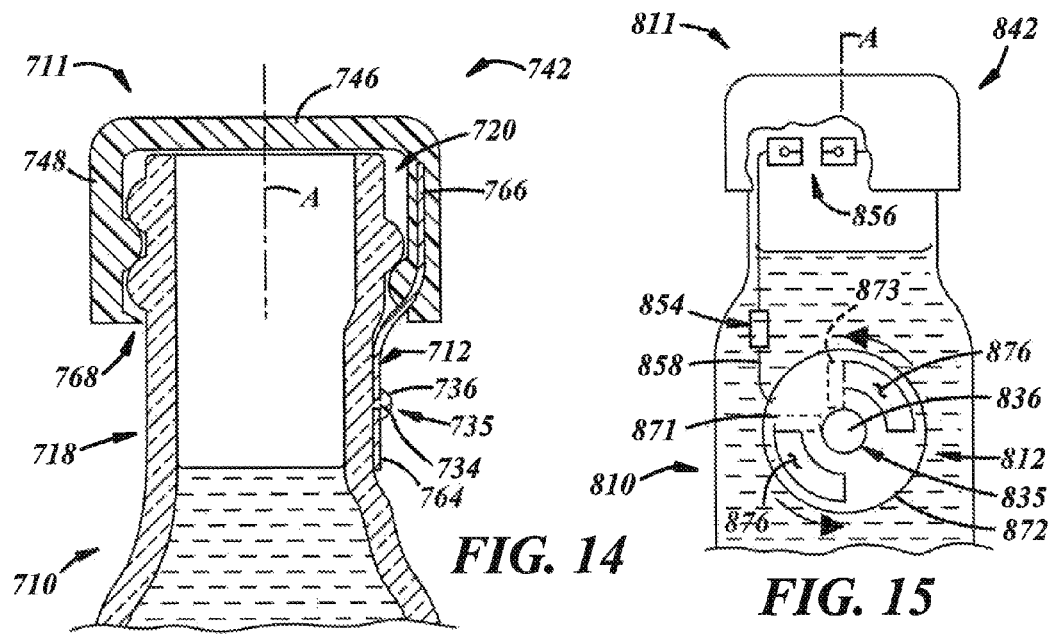

CONTAINER WITH A MEDAL

The present disclosure is directed to containers and methods of manufacturing containers and, more specifically, to attachments for containers.

BACKGROUND AND SUMMARY OF THE DISCLOSURE

A general object of the present disclosure, in accordance with one aspect of the disclosure, is to provide a container with a medal retained thereto as an attractive marker for tracking, anti-counterfeiting, tamper-indicating, and/or use-indicating purposes.

The present disclosure embodies a number of aspects that can be implemented separately from or in combination with each other.

A method of manufacturing a container in accordance with one aspect of the present disclosure includes the steps of forming a wall of a container to include a medal retainer, and retaining a medal to the container by forming a portion of the medal retainer of the container wall over a corresponding portion of the medal.

In accordance with another aspect of the disclosure, there is provided a container that includes a wall and a medal retained to the wall by container material of integral one-piece construction with the wall and extending over at least a portion of the medal.

In accordance with a further aspect of the disclosure, a container includes a wall, and a medal retained to the wall by a retainer of integral one-piece construction with the container and including a portion extending over the medal, wherein the medal and one or more portions of the container adjacent the medal have a shared unique appearance.

In accordance with an additional aspect of the disclosure, a package includes a container, a closure coupled to the container, a flaccid loop coupled between the closure and the container, and a medal coupled to the flaccid loop.

BRIEF DESCRIPTION OF THE DRAWINGS

The disclosure, together with additional objects, features, advantages and aspects thereof, will be best understood from the following description, the appended claims and the accompanying drawings, in which:

FIG. 1 is a fragmentary elevational view of a container manufactured to include a medal non-removably retained to the container in accordance with an illustrative embodiment of the present disclosure;

FIG. 1A is a rear view of the medal of FIG. 1;

FIG. 2 is an enlarged sectional view of the container of FIG. 1, taken along line 2-2 of FIG. 1 and showing the medal non-removably retained to the container;

FIG. 3 is an enlarged sectional view similar to that of FIG. 2, illustrating the medal applied to the container but before the medal has been non-removably retained to the container;

FIG. 4 is a fragmentary elevational view of a container manufactured to include a medal non-removably retained to the container in accordance with another illustrative embodiment of the present disclosure;

FIG. 5 is an enlarged sectional view of the container of FIG. 4, taken along line 5-5 of FIG. 4 and showing the medal non-removably retained to the container;

FIG. 6 is an enlarged sectional view similar to that of FIG. 5, illustrating the medal applied to the container but before the medal has been non-removably retained to the container;

FIG. 7 is a fragmentary perspective view of a container manufactured to include a medal non-removably retained to the container in accordance with a further illustrative embodiment of the present disclosure;

FIG. 8 is an enlarged sectional view of the container of FIG. 7, taken along line 8-8 of FIG. 7 and showing the medal insert molded to the container to non-removably retain the medal to the container;

FIG. 12 is a fragmentary, partially sectional, perspective view of a package in accordance with another illustrative embodiment of the present disclosure, and illustrating a medal non-removably retained to a container, and circuitry including an ultraviolet light source;

FIG. 13 is a fragmentary, partially sectional, perspective view of a package in accordance with yet another illustrative embodiment of the present disclosure, and illustrating a medal non-removably retained to a container, and circuitry including an ultraviolet light source;

FIG. 14 is a fragmentary, elevational, sectional view of a package in accordance with still another illustrative embodiment of the present disclosure, and illustrating a medal extending into a closure;

FIG. 15 is a fragmentary elevational view of a package in accordance with still a further illustrative embodiment of the present disclosure, and illustrating an electromagnetic medal and circuitry;

DETAILED DESCRIPTION OF PREFERRED EMBODIMENTS

Figure 9:
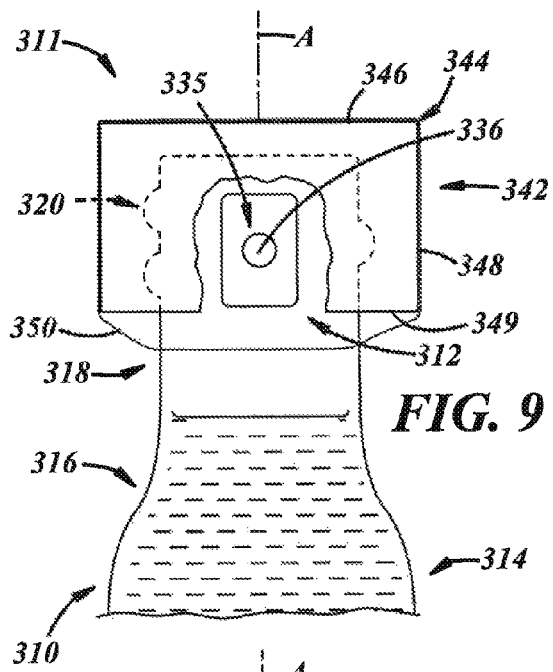
FIG. 9 is a fragmentary elevational view of a package in accordance with an additional illustrative embodiment of the present disclosure, and illustrating a medal non-removably retained to a container and covered by a closure coupled to the container.

FIG. 1 shows an illustrative embodiment of a container 10 (e.g., bottle, jar, jug, or the like) including a medallion or medal 12 separate from and carried by any suitable portion of the container 10. The medal 12 may be non-removably retained to the container 10 and may be used as a unique code for the container 10, as will be discussed in further detail herein below. The terminology "non-removably retained" includes a manner in which the medal 12 is, by design-intent, not intended to be removed from the container 10 without visible damage to the container 10. The container 10 may be produced in accordance with illustrative embodiments of a container manufacturing process presently disclosed herein below.

The container 10 may be of any suitable shape, and may include a jug, jar, bottle, other food or beverage container, or any other suitable container. The container 10 includes a longitudinal axis A, a base (not shown) at one axial end of the container 10 that is closed in an axial direction, a body 14 extending in an axial direction from the axially closed base, a shoulder 16 extending axially and radially from the body 14, and a neck 18 extending axially from the shoulder 16 and including a finish 20 having an open mouth 22 at another axial end of the container 10 opposite of the base. As used herein, the term "axial" includes oriented generally along a longitudinal axis of the container 10 and may include but is not limited to a direction that is strictly parallel to a container longitudinal central axis A. Likewise, the term "radial" includes oriented generally along a radial line with respect to the longitudinal axis of the container and may include but is not limited to a direction that is strictly perpendicular to the container longitudinal central axis A. The body 14 may be of any suitable shape in cross-section transverse to the axis A as long as the body 14 is circumferentially closed. For example, the body 14 may be of cylindrical transverse cross-sectional shape that is circumferentially closed. In other embodiments, the body 14 may be generally oval, square, rectangular, triangular, or of any other suitable transverse cross-sectional shape. As used herein, the term "circumferentially" applies not only to circular transverse cross-sectional shapes but also applies to any closed transverse cross-sectional shape.

Referring to FIGS. 1 and 2, the medal 12 may be coupled to the body 14 of the container 10 as illustrated, and/or may be coupled to any other suitable portion of the container 10, for example, the shoulder 16 or the neck 18 (FIG. 1). The medal 12 may be composed of a rigid material, for instance, at least one of metal, glass, or ceramic, or any other suitable rigid material, but preferably not plastic, or paper or other fibrous material. The medal 12 may include an outward surface 24 that may carry indicia 26 (FIG. 1), which may include a brand name, logo, slogan, or any other suitable indicia. The container 10 may include a depression 28 in a body wall in which the medal 12 may be carried. The medal 12 also may include an inward surface 30 that may carry an authentication code 32 (FIG. 1A), which may include a serial number or the like. In another embodiment, the code 32 may be carried on the outward surface 24 and the indicia 26 (FIG. 1) may be carried by the inward surface 30.

The medal 12 is non-removably retained to the container 10 with material of one-piece construction integral with a wall of the container 10. For example, the container 10 also may include a retainer 35, which may include a radially outwardly extending column, post, stud, or peg 34 having an enlarged head 36 that traps the medal 12 between the head 36 and the container body 14. The depression 28 and/or the peg 34 may be formed by corresponding features in a blank mold and/or a blow mold. In one example, the head 36 may be formed by swaging, or forming the free end of the peg 34 in any suitable manner. In another example, the medal 12 may be insert molded to the container 10, for example, by any suitable insert molding techniques in a blank or blow mold stage of container manufacturing. Although only one peg 34 is illustrated, any suitable quantity of pegs 34 may be used to secure the medal 12 to the container 10.

Referring to FIG. 3, the container 10 is shown with its body 14' in a pre-swaged condition. The container 10 includes a radially outwardly extending peg 34' before swaging. The medal 12 includes an aperture 38 therethrough between the outward and inward surfaces 24, 30. The medal 12 is applied to the container 10 over the peg 34' such that the peg 34' protrudes through the medal aperture 38, and such that the inward surface 30 of the medal 12' locates against an outward surface 40 of the container 10 within the depression 28. Then, the peg 34' may be swaged so as to form the head 36 illustrated in FIGS. 1 and 2. Depending on where in the manufacturing process the swaging is carried out, the swaging may be conducted with or without application of additional heat to the peg 34'.

FIGS. 4-6 illustrate another illustrative embodiment of a container 110. This embodiment is similar in many respects to the embodiment of FIGS. 1-3 and like numerals between the embodiments generally designate like or corresponding elements throughout the several views of the drawing figures. Accordingly, the descriptions of the embodiments are incorporated into one another. Additionally, the description of the common subject matter generally may not be repeated here.

Referring to FIGS. 4 and 5, a medal 112 may be non-removably retained to a body 114 of the container 110 as illustrated, and/or may be non-removably retained to any other suitable portion of the container 110, for example, a shoulder 116 or neck 118 (FIG. 4). The medal 112 may include an outward surface 124 that may carry any suitable indicia 126 (FIG. 4). The medal 112 also may include an inward surface 130 that may carry an authentication code. The container 110 may include a pocket in a container body wall in which the medal 112 may be carried. For example, the container 110 may include a radially outwardly extending annulus or rim 134 having a swaged head 136 that traps the medal 112 between the head 136 and the container body 114. The head 136 may be circumferentially continuous as illustrated, but instead may be circumferentially interrupted to include multiple flanges (not shown) that may be formed over corresponding portions of the medal 112.

Referring to FIG. 6, the container 110 is shown with its body 114' in a pre-swaged condition. The container 110 includes a radially outwardly extending cylindrical rim 134' before swaging. The medal 112 includes an outer edge 138, and the medal 112 is applied to the container 110 within the rim 134' such that the outer edge 138 is within the rim 134' and such that the inward surface 130 of the medal 112 locates against an outward surface 140 of the container 110 within the pocket or rim 134'. Then, the rim 134' may be swaged to or over the medal 112 so as to form the head 136 illustrated in FIGS. 4 and 5. The medal 112 and the rim 134' may be of circular shape, as illustrated, but instead may be square, rectangular, star-shaped, pentagonal, or of any other suitable shape.

FIGS. 7 and 8 illustrate another illustrative embodiment of a container 210. This embodiment is similar in many respects to the embodiment of FIGS. 1-6 and like numerals between the embodiments generally designate like or corresponding elements throughout the several views of the drawing figures. Accordingly, the descriptions of the embodiments are incorporated into one another. Additionally, the description of the common subject matter generally may not be repeated here.

Referring to FIG. 7, the medal 112 may be non-removably retained to a base 213 of the container 210 as illustrated, and/or may be non-removably retained to any other suitable portion of the container 210. The medal 112 may include an outward surface 124 that may carry any suitable indicia 126. Referring to FIG. 8, the medal 112 also may include an inward surface 130 that may carry an authentication code. The container 210 may include a retainer 235 that retains the medal 112 to the container 210. For example, the container 210 may include a pocket in a base wall in which the medal 112 may be carried. For example, the container 210 also may include an axially outwardly extending rim 234 that traps the medal 112 between the rim 234 and the container base 213. More specifically, the inward surface 130 of the medal 112 may locate against an outward surface 240 of the container 210 within the rim 234.

FIG. 9 illustrates another illustrative embodiment of a container 310 that may include a medal 312 responsive to a change associated with a closure 342 relative to the container 310. This embodiment is similar in many respects to the embodiment of FIGS. 1-8 and like numerals between the embodiments generally designate like or corresponding elements throughout the several views of the drawing figures. Accordingly, the descriptions of the embodiments are incorporated into one another, and the description of the common subject matter generally may not be repeated here.

In FIG. 9, a package 311 includes the container 310, a medal 312 retained to the container 310, and a closure 342 coupled to the container 310 and sealingly covering at least a portion of the medal 312. The container 310 includes a body 314, a shoulder 316 extending from the body, a neck 318 extending from the shoulder 316 and including a neck finish 320, which may include one or more thread segments, or any other suitable closure engagement features, to couple the closure 342 to the container 310. The medal 312 may be non-removably retained to a container wall, for instance, the container neck 318, for example, by an integral retainer 335. The retainer 335 may include an enlarged peg head 336, or any other suitable portion(s) of the container 310.

The medal 312 may include an air-reactive material that reacts with any one or more of the constituents of air so as to visibly change appearance of the material. For example, the air-reactive material may include, more particularly, an oxygen-reactive material or a nitrogen-reactive material. More specifically, the air-reactive material may include oxygen-reactive metals, polymers, or dyes. For instance, the air-reactive material may include copper, iron, potassium, sodium, PEN (polyethylene naphthalate), or polycarbonate. The medal 312 may be composed of such an air-reactive material, or may include a layer or coating of such material over any suitable substrate for the medal 312. Also, the medal 312 further may include a protective material (not shown) over the air-reactive material to protect the air-reactive material from premature exposure, and/or a scavenging material to protect the air-reactive material from premature exposure. Such materials and configurations are disclosed and shown in conjunction with FIGS. 4-19 of U.S. patent application Ser. No. 13/832,589 filed Mar. 15, 2013 (and entitled CONTAINER HAVING A USE INDICATOR), which was filed on the same date as the present application and is assigned to the assignee hereof and is incorporated herein by reference in its entirety.

The closure 342 may include a cap 344 that may be coupled to the container neck finish 320 in any suitable manner, for example, by threading, friction fit, or in any other suitable manner. The cap 344 may include a base wall 346, and an outer annular skirt 348 extending axially from the base wall 346 and terminating in a lower edge 349.

In one implementation of the present embodiment, the medal 312 may be completely covered in an axial direction by the cap 344 wherein the lower edge 349 of the skirt 348 extends axially below the medal 312. Also, the medal 312 may be sealed air-tight to the container 310 wherein an inner surface of the lower edge 349 of the skirt 348 may be in full circumferential sealing contact with the container neck 318.

In another implementation, the closure 342 also may include a cover 350 that may cover all or a portion of the closure cap 344 and extends below at least a portion of the medal 312 and over at least a portion of the container neck 318 in sealing contact therewith. For example, the cover 350 may be a shrink wrap, wax, or any other suitable covering that can provide an air-tight seal. Accordingly, the medal 312 may also or instead be sealed air-tight to the container 310 by the cover 350. The closure 342 and cover 350 are shown as being transparent, but may be opaque or translucent so that the medal 312 may be visible from outside the package.

In a further implementation, the medal 312 may not be sealed air-tight to the container 310 and, instead, may include a protective coating that may be removed when the closure 342 is removed. For example, the closure 342 may be adapted to scrape, pull, or peel the protective coating off of the medal 312 when the closure 342 is removed. More particularly, a portion of the cap 344, for example, the lower edge 349 thereof, may be adapted to scrape, pull, or peel the protective coating off the medal 312, for instance, via a sharp radially inwardly extending portion thereof. In the present embodiment, the medal 312 may provide an indication of use of the package 311 as described and shown in conjunction with FIGS. 1-3 of U.S. patent application Ser. No. 13/832,589 filed Mar. 15, 2013 (and entitled CONTAINER HAVING A USE INDICATOR), which was filed on the same date as the present application and is assigned to the assignee hereof and is incorporated herein by reference in its entirety.

During product packaging, the medal 312 may be assembled to the container 310 in an inert environment in any suitable manner, and the closure 342 may be sealingly applied to the container 310 to prevent oxidation of the medal 312.

Upon initial packaging of the package 311, the medal 312 may exhibit an initial or first state of a visual characteristic, for example, a first color or other appearance. (Therefore, the medal 312 and the closure 342 may be assembled to the container 310 in a vacuum, in an inert environment, or the like to prevent premature exposure of the medal 312.) But when exposed to air, for example, after removal of the closure 342 when initially opening the original package 311, and responsive to such opening, the medal 312 may exhibit another, second state of the visual characteristic, for example, a second color or other appearance. As used herein, the term "opening" includes partial or complete opening of a container, for example, partial turning or unthreading of a closure from the container or complete removal of a closure. As used herein, the term "removal" may include partial or complete removal.

The second state is different from and irreversible to the initial or first state. Accordingly, the state-changed medal 312 may indicate design-intent use of the package 311, like first time or initial container opening after the package 311 is factory sealed. The terminology "irreversible" includes a manner in which the medal is, by design-intent, modifiable in one direction, for example, transparent to opaque and not back to transparent, or in another example, opaque to transparent and not back to opaque.

Figure 10:
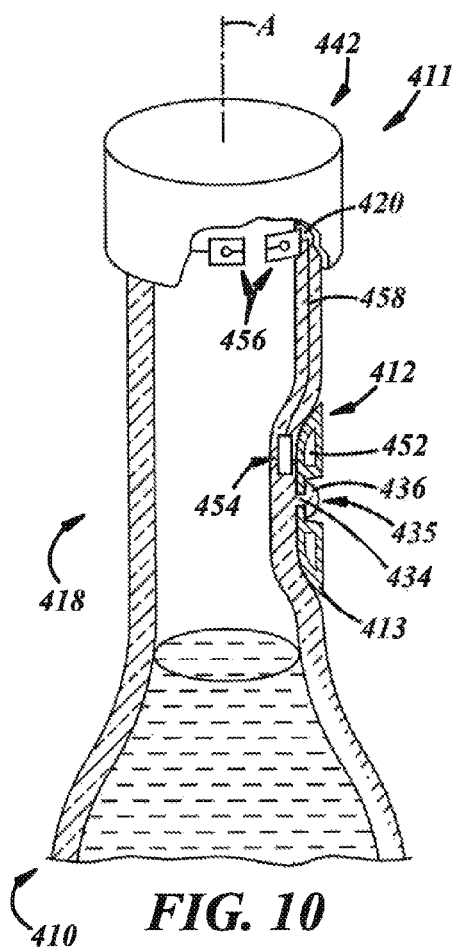
FIG. 10 is a fragmentary, partially sectional, perspective view of a package in accordance with another illustrative embodiment of the present disclosure, and illustrating a medal non-removably retained and in a first state of appearance.
Figure 11:
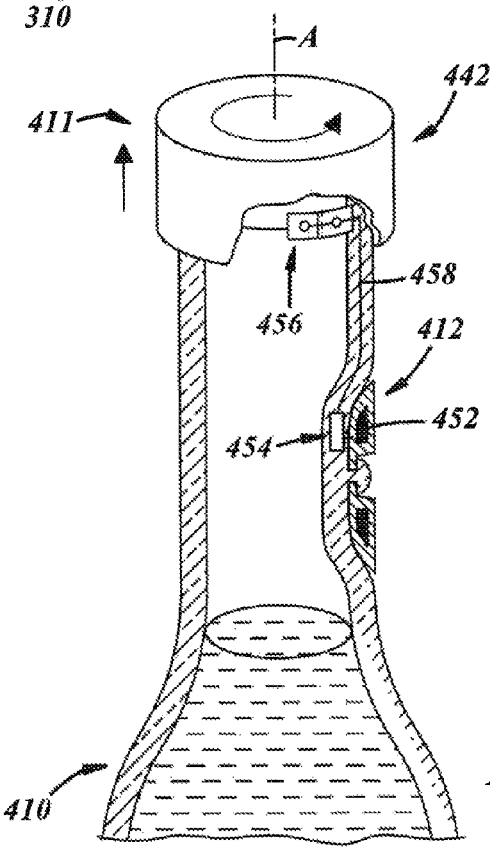
FIG. 11 a fragmentary, partially sectional, perspective view of the package of FIG. 10 and illustrating the medal in a second state of appearance.

FIGS. 10-11 illustrate another illustrative embodiment of a container 410 that may include a medal 412 responsive to a change associated with a closure 442 relative to the container 410. This embodiment is similar in many respects to the embodiment of FIGS. 1-9 and like numerals between the embodiments generally designate like or corresponding elements throughout the several views of the drawing figures. Accordingly, the descriptions of the embodiments are incorporated into one another, and the description of the common subject matter generally may not be repeated here.

The container 410 may carry a medal 412, for example, on a container neck 418, or in any other suitable location. The medal 412 may be non-removably retained to the container 410 by an integral retainer 435, which may include an enlarged head 436 of a stud 434 integrally formed with the container 410, or via any other suitable features, or in any other suitable manner. The medal 412 may include a substrate 413 which may carry one or more reactants 452 that react by receipt of electricity thereto from a power source. The reactants 452 may be carried in any suitable cavity, pocket, enclosed hollow portion, or the like, of the substrate 413.

Accordingly, the container 410 also may carry a normally open electrical circuit, which may include a power source 454, which may include one or more batteries, quartz piezoelectrics, capacitors, solar cells, or any other suitable supply of electricity. The power source 454 may be carried by any suitable container wall and is electrically connectable to the reactants 452 for electrifying the reactants 452 when the circuit is closed. Therefore, the container 410 additionally may carry a sensor 456, which may include contacts or any other suitable configuration, and any suitable electrical conductor(s) 458 coupling the power source 454 to the sensor 456 and the reactants 452. The sensor 456 may be carried by a neck finish 420. The sensor 456 may include a capacitive proximity sensor, magnetic sensor (e.g. reed switch), photoelectric sensor, inductive proximity sensor, or any other suitable sensor or switch. The conductor(s) 458 may include wiring, tracings, and/or the like. The circuit is shown as a schematic example, and any other suitable configurations suitable for powering an element upon closure removal are contemplated.

Moreover, the container 410 may be part of a package 411 including a closure 442 coupled to the neck finish 420 of the container 410. The sensor 456 may be configured to be closed upon removal (partial or complete) of the closure 442 from the container 410. In one embodiment, the closure 442 may be rotatably coupled to the container neck finish 420, for example, via thread segments, or any other suitable container/closure engagement elements. In such an embodiment, a portion of the closure 442 may displace one of the contacts of the sensor 456 into engagement with the other of the sensor contacts to close the circuit and discharge electricity from the battery 454 into the reactants 452.

In a first implementation of the present embodiment, the reactant(s) 452 may include electrochemically reactive products. For example, the reactants 452 may include magnesium, zirconium, xenon, potassium chloride, or any other suitable materials that may ignite once upon exposure to electricity and change appearance. Accordingly, the medal 412 and reactants 452 may be similar to an old photographic flashcube.

In a second implementation of the present embodiment, the reactant 452 may include an electrochromic material. For example, the reactant 452 may include an electrochromic polymer, or any other suitable electrochromic material that may change at least one of color or opacity upon exposure to electricity. Accordingly, the medal 412 may be an electrochromic (or electrochromatic) device, which may include electrically switchable or variable glass or glazing that has switchable or variable light transmission properties depending on voltage applied thereto. For example, in one or more embodiments, the electrochromic device may include "Smart Glass," "EGlass," "smart sunglass," or "smart window" light transmission technology.

In any of the aforementioned implementations, the medal 412 may exhibit a first visual characteristic, for example, a first color or other appearance before the reactant(s) 452 are electrified, as shown in FIG. 10. But when exposed to electricity, for example, upon removal of the closure 442, the medal 412 may exhibit a second visual characteristic, for example, a second color or other appearance upon electrification of the reactants 452, as shown in FIG. 11. In particular, the reactants 452 themselves may change appearance from a light appearance to a dark appearance. Accordingly, the state-changed medal 412 may indicate design-intent use of the package 411, like first time or initial container opening after the package 411 is factory sealed.

In other related embodiments, the circuit, including the closure 442, battery 454 and/or sensor 456, may be configured differently, for example, as described and shown in conjunction with FIGS. 10-15 of U.S. patent application Ser. No. 13/683,475 (and entitled CONTAINER HAVING A USE-EVIDENT DEVICE), which was filed on Nov. 21, 2012 and is assigned to the assignee hereof and is incorporated herein by reference in its entirety.

FIG. 12 illustrates another illustrative embodiment of a container 510 that may include a medal 512 responsive to a change associated with a closure 542 relative to the container 510. This embodiment is similar in many respects to the embodiment of FIGS. 1-11 and like numerals between the embodiments generally designate like or corresponding elements throughout the several views of the drawing figures. Accordingly, the descriptions of the embodiments are incorporated into one another, and the description of the common subject matter generally may not be repeated here.

The container 510 may be part of a package 511 including a closure 542 coupled to a container neck finish 520 of the container 510, which may carry a medal 512, for example, on a container neck 518, or in any other suitable location. The medal 512 may be non-removably retained to the container 510 by an integral retainer 535, which may include an enlarged head 536 of a stud 534 integrally formed with the container 510, or via any other suitable features, or in any other suitable manner. The medal 512 may be or may include a photochromic material, for example, photochromic glass or the like that may be activated by ultraviolet light upon opening of the package 511.

Accordingly, the container 510 also may carry an electrical circuit, which may include a power source 554, an ultraviolet (UV) light source 560, and a sensor 556 and electrical conductor(s) 558. The power source 554 may include one or more batteries, quartz piezoelectrics, capacitors, solar cells, or any other suitable supply of electricity. The power source 554 may be carried by any suitable container wall and is electrically connectable to the UV light source 560 for generating UV light when the sensor 556 is closed. The sensor 556 may include a capacitive proximity sensor, magnetic sensor (e.g. reed switch), photoelectric sensor, inductive proximity sensor, or any other suitable sensor or switch and related wiring, tracings, and/or the like.

In a reed switch embodiment or the like, the closure 542 may carry a sensor activator 562, for instance, a magnet, a ferrous metal, or any other suitable sensor activation component. The UV light source 560 may include one or more UV light emitting diodes (LEDs), or any other suitable source(s) of UV light.

The sensor 556 may be configured to be closed upon removal (partial or complete) of the closure 542 from the container 510. In one embodiment, the closure 542 may be rotatably coupled to the container neck finish 520, for example, via thread segments, or any other suitable container/closure engagement elements. In the illustrated embodiment, the sensor activator 562 may pass by the sensor 556 to activate the sensor 556 and thereby close the circuit and discharge electricity from the battery 554 to the UV light source 560. Such circuits and components are disclosed and shown in U.S. patent application Ser. No. 13/679,506 (and entitled PRODUCT AND PACKAGE WITH A PHOTOSENSITIVE USE-EVIDENT FEATURE), which was filed on Nov. 16, 2012 and is assigned to the assignee hereof and is incorporated herein by reference in its entirety.

The medal 512 may exhibit a first visual characteristic, for example, a first color or other appearance before the UV light source 560 is energized. But when exposed to UV light, for example, upon removal of the closure 542, the medal 512 may exhibit a second visual characteristic, for example, a second color or other appearance upon energizing of the light source 560. Accordingly, the state-changed medal 512 may indicate use of the package 511, like first time or initial container opening after the package 511 is factory sealed. As used herein, the term "use" may include design intent use, for example, package opening, product dispensing, and/or the like, but also may include unintended or unauthorized use, for example, product removal, product dilution, addition of counterfeit product, and/or the like.

In the illustrated embodiment, the UV light source 560 may be carried inside the container 510 on a wall thereof, which may be opposite that of the medal 512. Accordingly, the activated light source 560 will darken the glass 552 after opening and dispensing of certain UV blocking products P. In other embodiments, the UV light source 560 would be carried by the container 510 on a wall thereof in a location immediately adjacent or behind the medal 512. Accordingly, the activated light source 560 will darken the glass 552 upon opening even if the product P is a UV blocking type of product.

The container 510 may include a UV protector to protect the medal 512 from premature exposure to UV light. The UV protector may be carried by the container 510, either directly or indirectly. The UV protector may include any suitable UV blocking, UV absorbing, and/or UV retarding material or element of any kind. For example, UV protective material may include vanadium, selenium, carbon, iron, other glass colorant materials or colored glass, and/or the like. The UV protective material may be part of the container composition itself, a coating on interior and/or exterior surfaces of a substrate of the container 510 and/or the medal 512, and/or the like. In another example, the UV protector may include a shrink sleeve (not shown) around the container 510 and medal 512 and which includes UV protective material and which may be translucent or transparent. In any case, the UV protector may be provided over, around, or radially outward of, the medal 512 to protect it from exposure to UV light from outside the package 510.

FIG. 13 illustrates another illustrative embodiment of a package 611 that may include a medal 612 responsive to a change associated with a closure 542 relative to the container 510. This embodiment is similar in many respects to the embodiment of FIGS. 1-12 and like numerals between the embodiments generally designate like or corresponding elements throughout the several views of the drawing figures. Accordingly, the descriptions of the embodiments are incorporated into one another, and the description of the common subject matter generally may not be repeated here.

The package 611 is substantially similar to the package 511 of FIG. 12 including the container 510 and the closure 542, but including a different medal 612. The medal 612 may include a substrate 613 including a UV protector, and a sintered layer of photochromic glass 652 that may be applied to a rear (container facing) surface of the substrate 613. The substrate 613 may be composed of a UV protector material and/or may be coated with same. In another implementation, the photochromic glass 652 instead may be applied to a portion of the container 510 corresponding in outer profile to the medal 612.

In either case, the photochromic glass 652 may include any suitable metal halide material, which may include silver, copper, and/or cadmium with chlorine halide, bromine halide, and/or iodine halide. The photochromic material may include any suitable material selected from the group(s) consisting of the aforementioned materials, or from any other suitable photochromic material(s). The layer may be produced and applied by selectively applied ceramic label (ACL) or in a manner similar to ACL, which techniques—in and of themselves—are well known to those of ordinary skill in the art. For example, a metal halide containing glass may be produced, pulverized into fine particles of glass, and combined with organic binders, lubricants, flowing agents, and the like to produce a compound that can be heated and flowed onto the container 510 and/or the medal substrate 613 using screen printing or any other suitable techniques. Thereafter, the container 510 and/or medal substrate 612 with the sintered layer thereon may be heat treated, for example, through a decoration lehr to sinter the glass particles onto the container 510 and/or substrate 613. The photochromic glass 652 may be activated by ultraviolet light upon opening of the package 511. The photochromic glass 652 is protected by premature exposure to ambient UV light impinging on the outside of the package 611 by the UV protective medal substrate 613. Likewise, the photochromic glass 652 is protected from ambient UV light shining through the container 510 by flowable product P in the container 510. For example, some spirits, for instance, cognac, scotch whiskey, whiskey, and/or the like absorb much of the UV spectrum and can be used as a UV protector for the photochromic glass 652.

Again, the container 510 may carry the electrical circuit, with the power source 554, the UV light source 560, and the sensor 556 and conductor(s) 558. And again, the sensor 556 may be configured to be closed upon removal (partial or complete) of the closure 542 from the container 510 so as to discharge electricity from the battery 554 to the UV light source 560. UV light will impinge on the photochromic glass 652 to darken it.

Therefore, the medal 612 may exhibit a first visual characteristic, for example, a first color or other appearance before the UV light source 560 is energized. But when exposed to UV light, for example, upon removal of the closure 542, the medal 612 or at least the photochromic glass 652, may exhibit a second visual characteristic, for example, a second color or other appearance upon energizing of the light source 560. Accordingly, the state-changed medal 612 or photochromic glass 652 may indicate design-intent use of the package 611, like first time or initial container opening after the package 611 is factory sealed.

FIG. 14 illustrates another illustrative embodiment of a container 710 that may include a medal 712 responsive to a change associated with a closure 742 relative to the container 710. This embodiment is similar in many respects to the embodiment of FIGS. 1-13 and like numerals between the embodiments generally designate like or corresponding elements throughout the several views of the drawing figures. Accordingly, the descriptions of the embodiments are incorporated into one another, and the description of the common subject matter generally may not be repeated here.

The container 710 may be part of a package 711 including a closure 742 coupled to a neck finish 720 of a neck 718 of the container 710. The closure 742 may include a base wall 746, and an outer skirt 748 extending axially from the base wall 746. The closure 742 may be coupled to the container 710 in any suitable manner, for instance, via thread segments or any other suitable cooperative engagement elements on the container 710 and closure 742.

The container 710 may carry a medal 712, for example, on the container neck 718, or in any other suitable location. The medal 712 may be non-removably retained to the container 710 by an integral retainer 735, which may include an enlarged head 736 of a stud 734 integrally formed with the container 710, or via any other suitable features, or in any other suitable manner. The medal 712 may include a body portion 764 trapped between the head 736 and the container 710, and an extension portion 766 that extends axially toward the closure 742. The extension portion 766 may be radially spaced away from the container 710 and may extend axially into the closure 742. The medal 712 would be fully intact between the body and extension portions 764, 766 after initial packaging of the package 711, thereby indicating an authentic product.

But upon partial or complete removal of the closure 742, the medal 712 would be severed by the closure 742. For example, the closure skirt 748 may include a cutter 768 that may extend radially inwardly from a lower portion of the skirt 748. The cutter 768 may extend partially or completely circumferentially around the skirt 748, and may include a separate component or may include a sharp, radially inwardly extending, integral portion of the closure 742 itself. In another implementation, the cutter 768 may be exposed only upon application of axial downward pressure of the closure 742 toward the container 710.

Upon removal of the closure 742, the cutter 748 cuts through the medal 712 between the extension portion 766 and the body portion 764. The severed medal 712 provides an indication that the package 711 has been opened from its authentic, as-packaged state. The medal 712 may be relatively thin and of relatively soft metal composition, for instance, copper, or may be plastic and overmolded to the closure 742.

Figure 16:
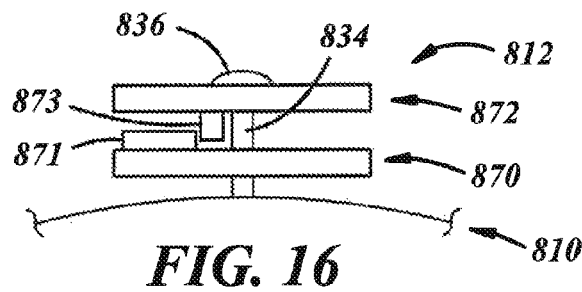
FIG. 16 is a fragmentary side view of the package of FIG. 15, illustrating first and second members of the medal.
Figure 17:
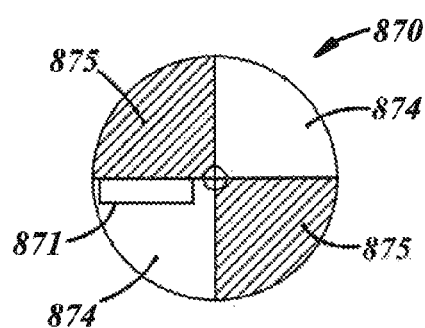
FIG. 17 is a front view of the first member of FIG. 16.

FIGS. 15-17 illustrate another illustrative embodiment of a package 811 that may include a medal 812 responsive to a change associated with a closure 842 relative to a container 810. This embodiment is similar in many respects to the embodiment of FIGS. 1-14 and like numerals between the embodiments generally designate like or corresponding elements throughout the several views of the drawing figures. Accordingly, the descriptions of the embodiments are incorporated into one another, and the description of the common subject matter generally may not be repeated here.

Referring to FIG. 15, the package 811 includes a container 810 including an electromagnetic medal 812 non-removably retained to the container 810 via an integral portion of the container 810, for instance, via an integral retainer 835 which may include an enlarged head 836 of the container 810. The package 811 also may include an electrical circuit, which may include the aforementioned components of the various electrical circuits described herein, including a power source 854, a sensor 856 and one or more electrical conductors 858 coupled to the medal 812.

With reference to FIG. 16, the medal 812 may include a first member 870 that may be fixed to and positioned adjacent to the container 810, and a second member 872 that may be movably coupled with respect to the container 810 and disposed radially outward of the first member 870 such that the first member 870 is positioned between the second member 872 and the container 810. The first member 870 includes a first magnetic element 871 and the second member 872 includes a second magnetic element 873 for cooperation with the first magnetic element 871. The magnetic elements 871, 873 may be fixed to or integral with the corresponding members 870, 872.

With reference to FIG. 17, the first member 870 (FIG. 16) may include one or more first portions 874 and one or more second portions 875 different in appearance than the first portions 874. For example, the first portions 874 may be light in appearance, for instance, white, and the second portions 875 may be dark in appearance, for instance, black. In other examples, the portions 874, 875 may be different colors, may exhibit different indicia, or may exhibit any other different appearance. The portions 874, 875 may include four 90-degree quadrants or any other suitable shape and configuration.

Referring again to FIG. 15, the second member 872 may include one or more windows 876, for example, apertures, to provide visible access to one or more portions of the first member 870 (FIG. 16). The windows 876 may include two diametrically opposed 90-degree quadrants or may be of any other suitable shape and configuration. In any event, the windows 876 may correspond to the portions 874 of the first member 870 (FIG. 16) to provide visible access thereto. In an as-packaged state, the windows 876 may be oriented to expose or provide visible access to the first portions 874 of the first member 870 (FIG. 16), for example, to provide an indication that the package 811 is authentic and has not been opened.

Upon partial or complete removal of the closure 842, however, the windows 876 may be oriented to expose the second portions 875 of the first member 870 (FIG. 16). For example, upon removal of the closure 842 the first magnetic element 871 may be powered via the circuit. More specifically, the electrical circuit may include the first magnetic element 871, which may be coupled to the power source 854 to energize the first magnetic element 871 upon removal of the closure 842. Energizing of the magnetic element 871 causes attraction of the second magnetic element 873 thereby causing rotation of the second member 872. Such rotation may continue until the magnetic elements 871, 873 contact one another and the windows 876 are oriented so as to expose the second portions 875 of the first member, for example, to provide an indication that the package 811 has been opened.

Those of ordinary skill in the art will recognize that the second member 872 may be rotatably coupled to the container 810, for instance, about the integral container peg 834, and that the first member 870 (FIG. 16) may be fixed to the container 810 against rotation by being friction fit to the peg 834, or in any other suitable manner. But artisans of ordinary skill will also recognize that the second member 872 could be fixed and the first member 870 (FIG. 16) could be rotatable. Artisans of ordinary skill would also recognize that the electromagnetic medal 812 could include linearly movable first and second members instead of the illustrated rotatable members.

In either implementation, the second member 872 is not movable with respect to the first member 870 (FIG. 16) absent energizing of the magnetic element. For example, a protective cover (now shown) may be non-removably coupled to the container 810 over the members 870, 872, or any suitable electrical functionality may be used to maintain the member 872 in place. Also, ratchet features could be provided between the members 870, 872 to prevent or provide an indication tampering with the medal 812.

Figure 18:
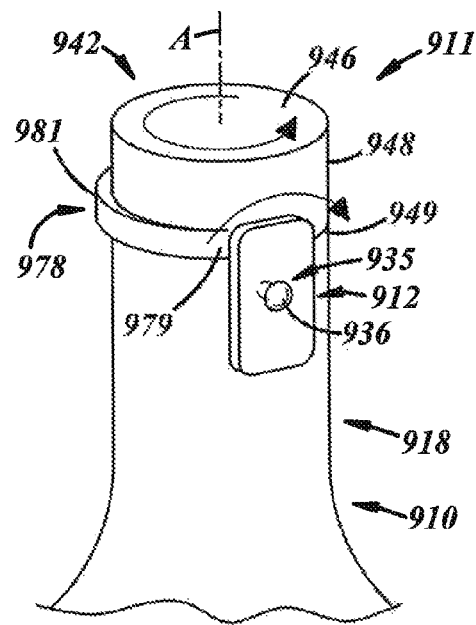
FIG. 18 is a fragmentary perspective view of a package in accordance with yet a further illustrative embodiment of the present disclosure, and illustrating a medal non-removably retained to a container, and a closure coupled to the container and having a cam adapted for engagement with the medal upon removal of the closure from the container.

FIG. 18 illustrates another illustrative embodiment of a package 911 that may include a medal 912 responsive to a change associated with a closure 942 relative to a container 910. This embodiment is similar in many respects to the embodiment of FIGS. 1-17 and like numerals between the embodiments generally designate like or corresponding elements throughout the several views of the drawing figures. Accordingly, the descriptions of the embodiments are incorporated into one another, and the description of the common subject matter generally may not be repeated here.

The package 911 includes a container 910 and a closure 942 coupled to a container neck 918 and, more particularly, to a neck finish (not separately shown) of the container 910. The package 911 also includes a medal 912 non-removably retained to the container neck 918 in a location axially adjacent to the closure 942. Although the illustrated embodiment includes an enlarged head 936 of an integral retainer 935 consistent with previously disclosed embodiments herein, those of ordinary skill in the art would recognize that the medal 912 may be non-removably retained by two or more such integral retainers, a pocketed retainer feature similar to FIGS. 4 and 7, or in any other suitable manner.

The closure 942 may include a base wall 946, an outer annular skirt 948 extending axially from the base wall 946 and terminating in an axial end surface 949, and a cam 978 carried by the skirt 948 for example, between the axial end surface 949 and the base wall 946. The skirt 948 may have an outer surface, and the cam 978 may extend radially outwardly with respect to the outer surface 948 of the skirt. For example, the cam 978 may include a leading edge 979 circumferentially adjacent to a cylindrical outer surface of the skirt 948, and a cam lobe 981 projected radially outwardly and extending circumferentially around a portion of the skirt 948.

During manufacture of the package 911, the closure 942 may be applied and tightened to the container 910 in any suitable manner, and then the medal 912 may be coupled to the container 910 with a rear surface facing the container 910. The medal 912 is coupled to the container 910 so that a portion of the medal 912 axially overlaps the closure 942. More specifically, the portion of the medal 912 may axially overlap the axial end surface 949 of the skirt 948, and at least a portion of the cam 978, such that when the closure 942 is rotated, the overlapping portion of the medal 912 overlaps at least a portion of the cam 978.

In use, and from the as-packaged state of the package 911, the closure 942 may be rotated with respect to the container 910 so as to force the cam 978 into engagement with the medal 912, for example, with the rear surface thereof. Continued rotation of the closure 942 with respect to the container 910 causes increasingly larger portions of the lobe 981 of the cam 978 to engage the medal 912 and thereby apply increased force to the medal 912. In turn, the force on the medal 912 is directed to the integral retainer feature 935, which eventually breaks under the applied force before the closure 942 is completely removed from the container 910. Accordingly, a portion of the container may be broken to free the medal 912 from the container 910 for keeping as a collectors' or promotional item.

Figure 19:
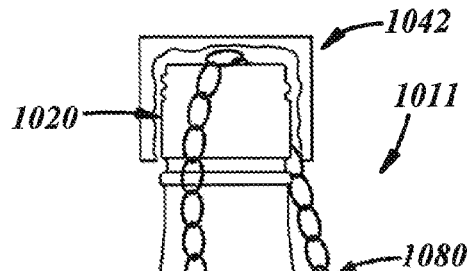
FIG. 19 is a fragmentary elevational view of a package in accordance with another illustrative embodiment of the present disclosure, and illustrating a medal non-removably retained to a container, and a flaccid loop coupled to the medal and captured between the container and a closure coupled thereto.

FIG. 19 illustrates another illustrative embodiment of a package 1011 that may include a medal 1012 responsive to a change associated with a closure 1042 relative to a container 1010. This embodiment is similar in many respects to the embodiment of FIGS. 1-18 and like numerals between the embodiments generally designate like or corresponding elements throughout the several views of the drawing figures. Accordingly, the descriptions of the embodiments are incorporated into one another, and the description of the common subject matter generally may not be repeated here.

The package 1011 includes a container 1010, a closure 1042 coupled to the container 1010, a medal 1012 carried by the container 1010, and a flaccid loop 1080 coupled to the medal 1012 and having a portion carried between the closure 1042 and the container 1010. The closure 1042 may be coupled to the neck finish 1020 of the container 1010 via cooperating thread segments, or any other suitable engagement elements, or in any other suitable manner. The flaccid loop 1080 may include a chain, as illustrated, a cord, a cable, or any other suitable flaccid loop, and may be used as a necklace or for any other suitable purpose. The loop 1080 may extend over the neck finish 1020 in any suitable manner that allows for closure 1042 application and removal. For example, the loop 1080 may extend through axially extending interruptions in thread segments thereof to allow the closure 1042 to be threaded to the neck finish 1020 over the loop 1080. Also, the loop 1080 may extend over the open mouth of the container 1010 as illustrated, and/or may wrap around the neck finish 1020.

From the as-packaged state, the closure 1042 may be removed from the container 1010 to allow the loop 1080 and the attached medal 1012 to be removed from the package 1011, at least in one embodiment. In another embodiment, as illustrated, the medal 1012 may be non-removably retained to the container 1010 via an integral retainer 1035, for example, an enlarged head 1036 of a peg. Accordingly, a user may pry on the medal 1012 to break the retainer 1035 and free the medal 1012.

In either embodiment, the medal 1012 and/or the loop 1080 may be used as a collectors' or promotional item. The lack of such item(s) from a package is in indication that the package is not authentic or is counterfeit. As with any of the presently disclosed embodiments, the closure 1042 may be coupled to the container 1010 with a tamper-evident band (not separately shown), overwrapped foil seal, or any other accessories.

Figure 20:
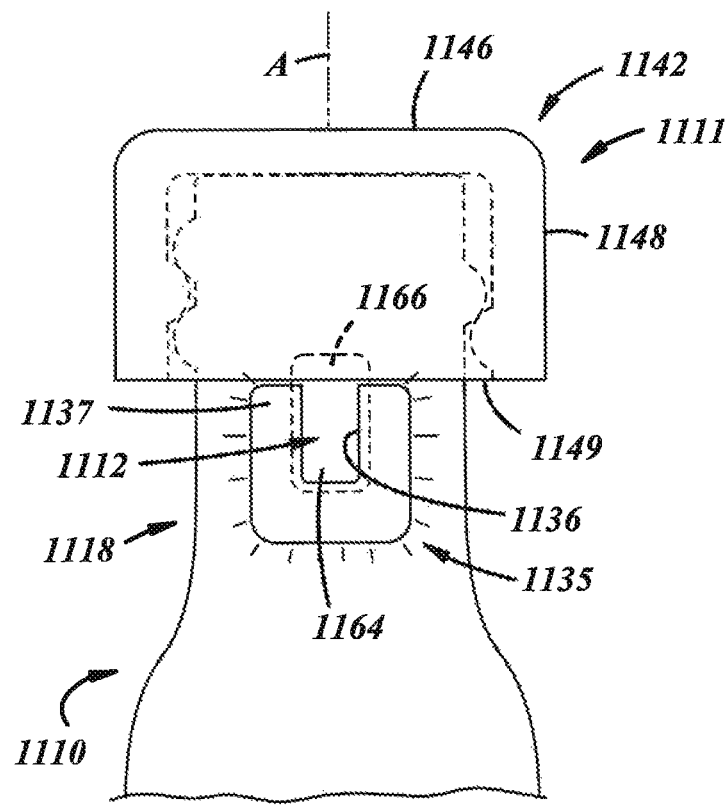
FIG. 20 is a fragmentary elevational view of a package in accordance with an additional illustrative embodiment of the present disclosure, and illustrating a medal having an axial end covered by a closure to prevent access thereto.

FIG. 20 illustrates another illustrative embodiment of a package 1111 that may include a medal 1112 responsive to a change associated with a closure 1142 relative to a container 1110. This embodiment is similar in many respects to the embodiment of FIGS. 1-19 and like numerals between the embodiments generally designate like or corresponding elements throughout the several views of the drawing figures. Accordingly, the descriptions of the embodiments are incorporated into one another, and the description of the common subject matter generally may not be repeated here.

The package 1111 includes a container 1110, a closure 1142 coupled to the container 1110, and a medal 1112 carried by the container 1110 and retained thereto with an integral retainer 1135 of the container 1110. The integral retainer 1135 may be similar to that shown and described with reference to FIGS. 4-7 except, in one example, the portion 1135 has an open axial end 1137 out of which the medal 1112 may protrude axially.

The closure 1142 includes a base wall 1146, an outer annular skirt 1148 that extends axially from the base wall 1146 and terminates in an axial end 1149. Those of ordinary skill in the art would recognize that the end 1149 may be part of a tamper indicating band (not separately sown) of the closure 1142 or a main body portion of the closure 1142.

The medal 1112 may include a body 1164 carried in the integral retainer 1135 and having an axial end 1166 that may be carried between the container 1110 and the closure 1142 wherein the closure 1142 covers a portion of the medal 1112. Accordingly, a portion of the medal 1164 may axially overlap a corresponding portion of the closure 1142 to block access to the axial end 1166 of the medal 1112.

During manufacture of the package 1111, the medal 1112 may be coupled to the container 1110 via the integral retainer 1135 by sliding the medal 1112 into a pocket defined radially between the retainer 1135 and an outer surface of the container neck 1118, or by forming the retainer 1135 over the medal 1112, for example at edges 1136, or any suitable manner. Thereafter, the closure 1142 may be non-removably retained to the container 1110 so that the axial end 1149 of the skirt 1148 extends below the axial end 1166 of the medal 1112.

In use, the closure 1142 may be completely removed from the container 1110 to expose and allow access to the axial end 1166 of the medal 1112. At that point, a user may remove the medal 1112 by grasping the end 1166 of the medal 1112, and sliding it out of the retainer 1135 or breaking it free from the retainer 1135, or in any other suitable manner.

Figure 21:
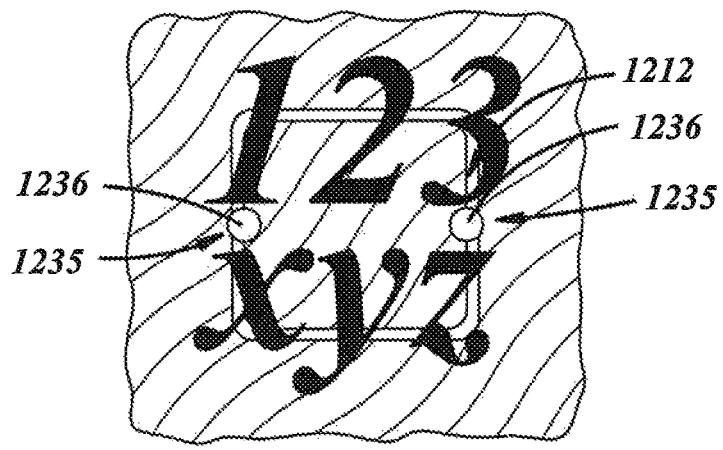
FIG. 21 is a fragmentary front view of a container including a medal non-removably retained thereto and having an appearance shared with a portion of the container.

FIG. 21 illustrates another illustrative embodiment of a container 1210. This embodiment is similar in many respects to the embodiment of FIGS. 1-20 and like numerals between the embodiments generally designate like or corresponding elements throughout the several views of the drawing figures. Accordingly, the descriptions of the embodiments are incorporated into one another, and the description of the common subject matter generally may not be repeated here.

The container 1210 may include a medal 1212 non-removably retained to an outer surface thereof consistent with previously disclosed embodiments. For example, the medal 1212 may be retained to the container 1210 with integral retainers 1235 of the container 1210 itself. In the illustrated embodiment, the retainers 1235 may include enlarged heads 1236 of integral container pegs (not separately shown) to trap edges of the medal 1212 to the container 1210. Of course, any other suitable configuration may be used including retainers extending through apertures (not shown) through the medal 1212, or a retaining frame over the outer periphery of the medal 1212 like that of FIGS. 4 and 7, or the like.

The medal 1212 and portions of the container 1210 adjacent or surrounding the medal 1212 may have a shared unique appearance. An example shared unique appearance is indicated schematically by a common continuous pattern, for instance a wavy line pattern, over both the medal 1212 and at least a portion of the container 1210. In another example of a shared unique appearance, common continuous indicia (like text or numerals) may extend over both the container 1210 and the medal 1212. The indicia may include a serial number, phrase, or any other suitable indicia.

The medal 1212 may be removed from the container 1210 by using a key or other implement to pry on the medal 1212 and fracture the integral retainers 1235. But once the medal 1212 is removed from the container 1210, it cannot be easily replaced with a replacement medal because its appearance would not be shared with the original container. Accordingly, the attached medal 1212 and appearance shared with the container 1210 provide an anti-counterfeit measure.

In general, the containers described above can be produced in any suitable manner. The containers may be composed of glass, plastic, or metal, and may be of one-piece integrally formed construction. (The term "integrally formed construction" does not exclude one-piece integrally molded layered constructions of the type disclosed in, for example, U.S. Pat. No. 4,740,401, or one-piece containers to which other structure is added after the container-forming operation.) In a glass embodiment, the containers may be fabricated in a press-and-blow, narrow neck press-and-blow, or a blow-and-blow container manufacturing operation. In a plastic embodiment, the containers may be produced in an injection, compression, and/or blow molding operation. In a metal embodiment, the containers may be manufactured in a roll forming and welding operation, or in any other suitable manner. Below, an example glass container manufacturing process is described. But many of the principles described below are applicable to plastic container and metal container manufacturing processes.

For example, a typical glass container manufacturing process includes a "hot end" and a "cold end." The hot end may include one or more glass melting furnaces to produce a glass melt, one or more forming machines to form the glass melt into containers, and one or more applicators to apply a hot-end coating to the containers. The "hot end" also may include an annealing lehr, or at least a beginning portion of the annealing lehr, for annealing the containers therein. Through the lehr, the temperature may be brought down gradually to a downstream portion, cool end, or exit of the lehr. The "cold end" may include an end portion of the annealing lehr, applicators to apply one or more cold-end coatings to the containers downstream of the annealing lehr, inspection equipment to inspect the containers, and packaging machines to package the containers.

In conjunction with the above description, the containers may be produced by the following container manufacturing process, which may or may not include all of the disclosed steps or be sequentially processed or processed in the particular sequence discussed, and the presently disclosed manufacturing process and marking methods encompass any sequencing, overlap, or parallel processing of such steps.

First, a batch of glass-forming materials may be melted. For example, a melting furnace may include a tank with melters to melt soda-lime-silica to produce molten glass. Thereafter, the molten glass may flow from the tank, through a throat, and to a refiner at the downstream end of the furnace where the molten glass may be conditioned. From the furnace, the molten glass may be directed toward a downstream forehearth that may include a cooling zone, a conditioning zone, and a downstream end in communication with a gob feeder. The feeder may measure out gobs of glass and deliver them to a container forming operation.

Next, the glass gobs may be formed into containers, for example, by forming machines, which may include press-and-blow or blow-and-blow individual section machines, or any other suitable forming equipment. Blank molds may receive the glass gobs from the feeder and form parisons or blanks, which may be at a temperature on the order of 900-1100 degrees Celsius. Blow molds may receive the blanks from the blank molds and form the blanks into containers, which may be at a temperature on the order of 700-900 degrees Celsius. Material handling equipment may remove the containers from the forming machines and place the containers on conveyors or the like.

Also, the formed containers may be annealed, for example, by an annealing lehr. At an entry, hot end, or upstream portion of the annealing lehr, the temperature therein may be, for instance, on the order of 500-700 degrees Celsius. Through the lehr, the temperature may be brought down gradually to a downstream portion, cool end, or exit of the lehr, for example, to a temperature therein on the order of 100 degrees Celsius.

At any suitable point(s) in the manufacturing process, the containers are tagged with medals. The tagging step includes applying medals to the containers or to the blanks to mark the containers or blanks.

In one example, the medals may be applied to the blanks in the blank molds or to the containers in the blow molds, for instance, by insert molding the medals onto the bases of the blanks or the containers as they are formed. For example, a robotic arm or pick-and-place unit may be used to pick up a medal and place it in a recess or detent in a mold. Accordingly, in one embodiment, a forming step may include sub-steps of forming a blank and then forming the container from the blank, wherein the medal is insert molded to the blank during the blank forming step. In another embodiment, the forming step may includes sub-steps of forming a blank and then forming the container from the blank, wherein the medal is insert molded to the container during the container forming step.

In another example, the medals may be applied to the containers downstream of the blow molds. For instance, portions of the containers may be swaged to retain the medals to the containers between the forming and annealing steps, using any suitable material handling and swaging equipment. The swaging equipment may include heaters to heat the container projections before and/or during swaging, and may include swaging heads to contact and deform the container projections over the medals. For example, the heaters may include torches, induction coils, lasers, or any other suitable heating devices, and the swaging heads may include rotary, reciprocating, vibrational, or other types of swaging heads. As used herein, the term "swage" includes cold or hot swaging, stationary or rotary swaging, or any other suitable process of forming container material with respect to the medals to secure the medals to the containers.

The container forming step may include forming a radially outwardly extending peg integrally with a wall of the container. Also, the container forming step may include forming a depression in the wall of the container around the peg. In another embodiment, the container forming step may includes forming a radially outwardly extending rim in a wall of the container.

The retaining step may include placing the medal over the peg and against the container wall and swaging the peg, so that container material flows axially or transversely with respect to the axis of the peg, thereby forming a head on the peg to trap the medal between the head and the container wall so that the head extends over a portion of the medal to non-removably retain the medal to the container. Also, the retaining step may include placing the medal in a depression formed in the container. In another embodiment, the retaining step may include placing the medal within a rim and against the container wall and swaging the rim over a radially outer edge of the medal to form a retaining flange on the rim to trap the medal between the flange and the container wall so that the rim flange extends over a portion of the medal to non-removably retain the medal to the container. In either embodiment, the retaining step may include applying the medal to the container so that decorative indicia on one side of the medal faces outwardly, and/or so that authentication indicia on one side of the medal faces inwardly. Also, in either embodiment, the retaining step further may include applying solder glass between the medal and the container, adhering the medal to the container with an adhesive, or the like, for example, to supplement retention of the medal to the container.

In any case, the medals are non-removably retained to corresponding wall(s) of the containers so that the medals cannot be removed without destroying or damaging the containers, such that the medals serve as tamper-resistant authentication markers. If desired, the container may be damaged or destroyed to gain separate access to the medals, for example, where the medals are sought after as collectors' items. Accordingly, separate bar code labels or the like need not be applied to the containers. Unlike typical bar code labels that are flexible and can be easily torn away from containers, the presently disclosed medals are rigid and cannot be pulled away from the containers without breaking one or more portions of the containers. And even if the medals could somehow be removed, replacement medals could not be attached to the containers in their original manner thereby providing indication of a lack of authenticity. Bar code labels and the like may be easily tampered with, add significant cost to the process, and may detract from a brand appeal of a product.

In use, a product manufacturer can fill a container with product, record an authentication code from the container medal, and store information about the product in conjunction with the serial code as a record in a production database or the like. Later in the product cycle, a distributor, consumer, or the like can read the serial code from the medal, access the manufacturer's production database via the Internet or otherwise, and search the database for the serial code to authenticate the container and/or the product inside the container.

Accordingly, the medals can be used throughout a distribution and supply chain for container or product tracking and tracing, returning and refilling, and/or authenticity verification of the container and/or the product contained within the container. For example, a variety of attributes can be verified or added during the product cycle, for instance, the date and/or location of manufacture of the container, the product contained within the container, authenticity of the container and/or the product therein. In some of the embodiments, the act of removing the closure and/or the medal causes visible damage to the container. Also in some embodiments, for instance with those shown in FIGS. 19 and 20, the medal may be removed without damage to the container and the fact that the medal is missing is an indication that the package has been previously opened, is counterfeit, or the like.

There thus has been disclosed a container and methods of manufacture, that fully satisfy all of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A method of manufacturing a container which includes the steps of:

forming a wall of a container to include a medal retainer; and retaining a medal to the container by forming a portion of the medal retainer of the container wall over a corresponding portion of the medal, wherein the step of forming the wall of the container includes forming a radially outwardly extending peg in the wall of the container, and the retaining step includes placing the medal over the peg and against the container wall and swaging the peg to form a head on the peg to trap the medal between the head and the container wall so that the medal is non-removably retained to the container.

2. The method set forth in claim 1 wherein the step of forming the wall of the container includes forming a depression in the wall of the container around the peg, and the retaining step includes placing the medal in the depression.

3. The method set forth in claim 1 wherein the retaining step includes retaining the medal to a body wall of the container.

4. The method set forth in claim 1 wherein the step of forming the wall of the container includes sub-steps of forming a blank and then forming the container from the blank, and wherein the medal is insert molded to the blank during the blank forming step.

5. The method set forth in claim 1 wherein the step of forming the wall of the container includes sub-steps of forming a blank and then forming the container from the blank, and wherein the medal is insert molded to the container during the container forming step.

6. A container produced by the method set forth in claim 1.

7. A package including a closure coupled to the container set forth in claim 6, and wherein the medal exhibits an initial state of a visual characteristic in an as-packaged state.

8. A package comprising:
a container including a wall having a medal retainer including a portion overlying a corresponding portion of a medal; and
a closure coupled to the container,
wherein the medal exhibits an initial state of a visual characteristic in an as-packaged state, and wherein, responsive to opening of the package, the medal exhibits another state of the visual characteristic different from and irreversible to the initial state of the visual characteristic.

9. A container composed of glass that includes a wall having a pocket, and a medal composed of metal and retained to the wall by container material of integral one-piece construction with the wall and extending over at least a portion of the medal, wherein the medial is retained by after-mold deformation of at least a portion of a periphery of the pocket over the medal so that the medal is non-removably retained to the container, wherein the medal has an aperture, and the wall includes a portion received through the aperture and extending over at least a portion of the medal to retain the medal on the wall so that the medal is non-removably retained to the container.

10. A package that includes
a container including a wall and a medal retained to the wall by container material of integral one-piece construction with the wall and extending over at least a portion of the medal, and
a closure coupled to a neck finish of the container, and wherein the medal is responsive to a change associated with the closure relative to the container.

11. The package set forth in claim 10, wherein the closure sealingly covers at least the portion of the medal, which, upon contact with air, is adapted irreversibly to change a characteristic of the medal that is visible from outside of the container to indicate to a user that the package has been used.

12. The package set forth in claim 10, that includes a sensor to detect removal of the closure from the container, and a power source coupled to the sensor and in electrical communication with the medal.

13. The package set forth in claim 10, wherein the medal extends axially into the closure, and the closure includes a cutter that severs the medal upon removal of the closure.

14. The package set forth in claim 10, wherein the closure includes a cam, and the medal extends axially to axially overlap the cam, wherein removal of the closure causes the cam to impose an increasing force on the medal and on the retainer to fracture the retainer and free the medal from the container.

15. The package set forth in claim 10, wherein the medal extends axially and includes an axial end portion located between the closure and the container and covered by the closure, wherein removal of the closure renders accessible the axial end portion of the medal to facilitate removal thereof from the container.

16. The package set forth in claim 10, wherein the medal is coupled to a rest of the package by a flaccid loop coupled to the medal and having a portion captured between the closure and the container, wherein removal of the closure renders accessible and removable the flaccid loop.

17. A package that includes
a container including a neck finish, a wall and a medal retained to the wall by container material of integral one-piece construction with the wall and extending over at least a portion of the medal,
a closure coupled to the neck finish of the container, and wherein the medal is responsive to a change associated with the closure relative to the container, wherein the closure sealingly covers at least a closure portion of the medal, which, upon contact with air, is adapted irreversibly to change a characteristic of the medal that is visible from outside of the container to indicate to a user that the package has been used,
a sensor to detect removal of the closure from the container, and
a power source coupled to the sensor and in electrical communication with the medal,
wherein the medal carries reaction products that ignite upon receiving electricity from the power source.

18. A package that includes
a container including a wall and a medal retained to the wall by container material of integral one-piece construction with the wall and extending over at least a portion of the medal,
a closure coupled to the neck finish of the container, and wherein the medal is responsive to a change associated with the closure relative to the container, wherein the closure sealingly covers at least a closure portion of the medal, which, upon contact with air, is adapted irreversibly to change a characteristic of the medal that is visible from outside of the container to indicate to a user that the package has been used,
a sensor to detect removal of the closure from the container, and
a power source coupled to the sensor and in electrical communication with the medal, wherein the medal carries an electrochromic material that changes at least one of color or opacity upon receiving electricity from the power source.

19. A package that includes
a container including a wall and a medal retained to the wall by container material of integral one-piece construction with the wall and extending over at least a portion of the medal,
a closure coupled to the neck finish of the container, and wherein the medal is responsive to a change associated with the closure relative to the container, wherein the closure sealingly covers at least a closure portion of the medal, which, upon contact with air, is adapted irreversibly to change a characteristic of the medal that is visible from outside of the container to indicate to a user that the package has been used,
a sensor to detect removal of the closure from the container, and
a power source coupled to the sensor and in electrical communication with the medal,
wherein the medal is an electromagnetic device.

20. The package set forth in claim 19, wherein the medal includes:
a first member coupled to the container and including first and second portions having appearances different from one another and including a first magnetic element, and
a second member coupled to the container and disposed radially outward of the first member such that the first member is positioned between the second member and the container, and including a second magnetic element and at least one window to provide visible access to the first portion of the first member in an as-packaged state of the package to provide an indication that the package is authentic and has not been opened,
wherein, upon receiving electricity from the power source, the first magnetic element is energized and attracts the second magnetic element to cause relative movement between the first and second members and reorient the at least one window with respect to the first member to expose the second portion of the first member to provide an indication that the package has been opened.

* * * * *